(12) United States Patent
Mizuta

(10) Patent No.: US 7,337,819 B2
(45) Date of Patent: Mar. 4, 2008

(54) ALIGNMENT DEVICE FOR FABRICATING OPTICAL DISK

(75) Inventor: Akira Mizuta, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 372 days.

(21) Appl. No.: 11/043,955

(22) Filed: Jan. 28, 2005

(65) Prior Publication Data

US 2005/0173072 A1 Aug. 11, 2005

(30) Foreign Application Priority Data

Feb. 5, 2004 (JP) ............... 2004-029323

(51) Int. Cl.
*B32B 37/00* (2006.01)
(52) U.S. Cl. .............. 156/391; 156/538; 156/556; 156/580
(58) Field of Classification Search ........... 156/391, 156/538, 556, 580, 581, DIG. 1, DIG. 2, 156/DIG. 37
See application file for complete search history.

(56) References Cited

U.S. PATENT DOCUMENTS

| | | | |
|---|---|---|---|
| 6,273,167 B1 * | 8/2001 | Miller | 156/391 |
| 6,660,113 B2 * | 12/2003 | Hummell et al. | 156/60 |
| 6,748,994 B2 * | 6/2004 | Wien et al. | 156/391 |
| 6,960,269 B2 * | 11/2005 | Miyamoto et al. | 156/74 |
| 2002/0020502 A1 * | 2/2002 | Miller | 156/391 |
| 2002/0174955 A1 * | 11/2002 | Hummell et al. | 156/391 |

FOREIGN PATENT DOCUMENTS

| | | |
|---|---|---|
| JP | 11-31337 A | 2/1999 |
| JP | 2003-217192 A | 7/2003 |

\* cited by examiner

*Primary Examiner*—James Sells
(74) *Attorney, Agent, or Firm*—Sughrue Mion, PLLC

(57) ABSTRACT

In an optical disc fabricating apparatus, when the disc substrate is lowered from the tip of a disc inserting portion at a center pin down to a disc supporting portion, a disc urging portion of an alignment lever is pressed by a disc substrate, to be thus pushed in toward an inner periphery and a sheet urging portion is pushed out toward an outer periphery, so as to press the inner peripheral surface of a cover sheet so that both of the cover sheet and the disc substrate are urged in an alignment direction. Thus, it is possible to eliminate play generated between the inner peripheral surface of the cover sheet and the outer peripheral surface of a sheet inserting portion and play generated between the inner peripheral surface of the disc substrate and the outer peripheral surface of the disc inserting portion.

20 Claims, 12 Drawing Sheets

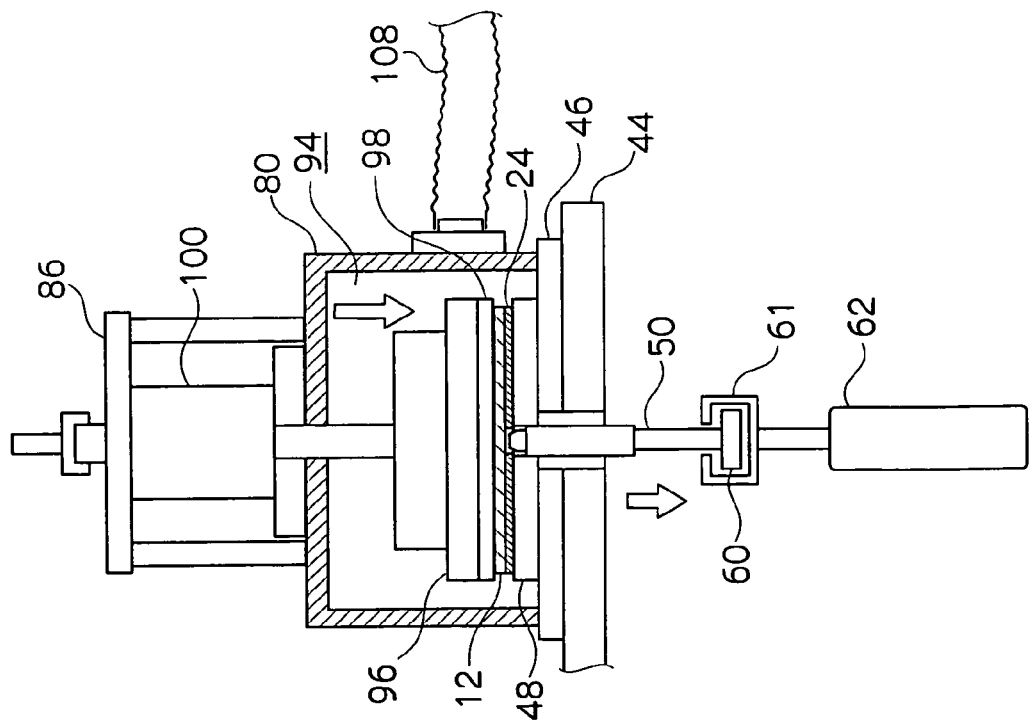
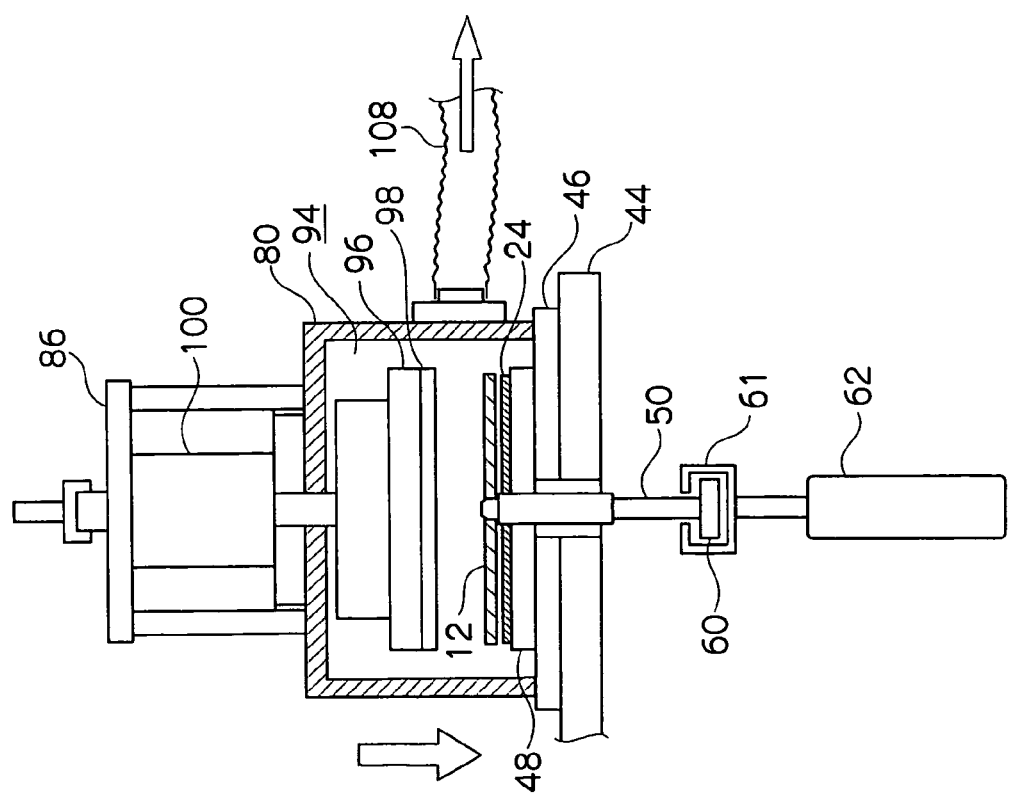

ALIGNMENT DEVICE FOR FABRICATING OPTICAL DISK

CROSS-REFERENCE TO RELATED APPLICATION

This application claims priority under 35 USC 119 from Japanese Patent Application No. 2004-029323, the disclosure of which is incorporated by reference herein.

BACKGROUND OF THE INVENTION

1. Field of the Invention

The present invention relates to an alignment device for fabricating an optical disc, in which the center of a thin film-like cover sheet is aligned with the center of a disc substrate when an optical disc is fabricated by sticking the cover sheet onto a recording surface of the disc substrate.

2. Description of the Related Art

Already widespread are optical discs such as CD-R (Compact Disc-Recordable), CD (Compact Disc), DVD (Digital Versatile Disc), and DVD-R (Digital Versatile Disc-Recordable) for recording or reproducing information by the use of a laser beam. In recent years, storage of increasing quantities of information, such as video information, has been demanded for optical discs, and therefore, high density of recording information is progressively being studied. Such information recording densities of optical discs generally depend upon a spot size of the light beam on the disc. The spot size is proportional to $\lambda$/NA, where $\lambda$ designates a wavelength of the laser and NA denotes the numerical aperture of an objective lens. Consequently, in order to enhance the recording density of the optical disc, to be effective it is required that the wavelength of the laser beam be shortened, and further, that the NA of the objective lens be increased. Since a comatic aberration generated by inclination of the optical disc becomes larger in proportion to the cube of the NA, the margin with respect to inclination such as tilt of the disc becomes markedly small with higher NA. Therefore, the beam spot is blurred even with slight inclination, thereby making it impossible to achieve recording and reproduction at a high density. Hence, it is necessary to form a cover layer serving as a laser beam transmitting layer of a satisfactory thinness (for example, as thin as about 0.1 mm) in the conventional optical disc suitable for high density, and, it is necessary to suppress an increase in spatial aberration (comatic aberration) caused by inclination of the disc in association with high NA (for example, see Japanese Patent Application Laid-Open (JP-A) No. 11-31337, pages 9 and 10 and FIG. 4).

In a fabrication line of the above-described optical disc, for example, a thin film-like cover sheet made of a resin film is stuck onto a recording surface of a disc substrate, having an information recording layer previously formed thereon. Thus, a transparent cover layer is formed on the disc substrate by the cover sheet, thereby fabricating the optical disc. Here, the cover sheet is formed of a resin film and an adhesive film formed at one surface of the resin film. When the cover sheet is stuck onto the disc substrate, a laminate consisting of the cover sheet and the disc substrate (hereinafter referred to as "a disc laminate") is first formed by laminating the disc substrate onto the adhesive film of the cover sheet. In this state, the entire adhesive film is not uniformly brought into contact with the recording surface of the disc substrate, and therefore, the cover sheet is not joined to the disc substrate by satisfactory joining force. As a consequence, in the fabrication line of the optical disc, the disc laminate is pressed along its thickness direction under a predetermined pressing force, so that the entire cover sheet is uniformly brought into contact with the recording surface of the disc substrate. Thus, the cover sheet in the disc laminate is stuck to the disc substrate by satisfactory joining force, thereby fabricating the optical disc to be used as a product material.

In an optical disc, such as fabricated as described above, it is necessary to align the center of the disc substrate and the center of the cover sheet with each other with satisfactory high degree of accuracy. Specifically, the eccentricity tolerance of the cover sheet with respect to the center of the disc substrate needs be set to about 100 µm.

One example of an optical disc fabricating apparatus for fabricating the above-described optical disc (hereinafter referred to as "an optical disc fabricating apparatus") is disclosed in JP-A No. 2003-217192, page 8 and FIGS. 1 and 2. In the optical disc fabricating apparatus disclosed in JP-A No. 2003-217192, a cover sheet is vacuum-adsorbed to a biaxial alignment stage 2, to be then moved to an image processing position, at which CCD cameras and the like are disposed. Thereafter, at the image processing position, images at outer peripheral portions of the information recording region of the cover sheet are taken by the three CCD cameras arranged at intervals of 90°. Subsequently, in the optical disc fabricating apparatus, eccentric alignment is carried out by: moving the biaxial alignment stage in two axes (i.e., in the XY-axes directions) by comparison of the image information taken from the outer peripheral portion of the information recording region of the cover sheet with reference data; a disc substrate is supplied onto the biaxial alignment stage; a three-point clamp device is inserted into a center hole formed in the disc substrate; and the disc substrate is centered (that is, center alignment) while the disc substrate is clamped by the three-point clamp device. After that, in the optical disc fabricating apparatus, the cover sheet and the disc substrate are housed inside a vacuum tank together with the biaxial alignment stage, and then, the pressure inside of the vacuum tank is reduced to a predetermined degree of vacuum. Thereafter, the disc substrate is pressed toward the cover sheet on a support table by a pad serving as a pressing member having elasticity in the vacuum tank, so that the cover sheet and the disc substrate are stuck to each other.

However, in order to align the center of the cover sheet and the center of the disc substrate with each other with satisfactory accuracy, the above-described optical disc fabricating apparatus needs be provided with: a plurality of CCD cameras; an information processor for processing image information obtained by the CCD cameras, so as to produce positioning control information; and an alignment stage which can be positionally adjusted in two axes with high accuracy in accordance with the control information output from the information processor. Therefore, problems arise since the above-described optical disc fabricating apparatus includes a complicated mechanism (i.e., an alignment mechanism) for aligning the center of the cover sheet and the center of the disc substrate with each other with the satisfactory accuracy. Furthermore the time required, for aligning the center of the cover sheet and the center of the disc substrate with each other with satisfactory accuracy, becomes long.

SUMMARY OF THE INVENTION

In view of the above-described problems experienced in the prior art, the present invention provides an alignment device for fabricating an optical disc, in which the center of a cover sheet and the center of a disc substrate can be aligned with each other with satisfactory accuracy simply by inserting a center pin disposed at a support table into both of an opening formed at the cover sheet and a center hole formed at the disc substrate.

An alignment device for fabricating an optical disc according to the invention, in which the center of a cover sheet and the center of a disc shaped disc substrate are aligned with each other when an optical disc is fabricated with the disc substrate having a circular center hole bored at the center thereof and the cover sheet having a circular opening greater in diameter than the center hole bored in the center of the disc substrate being stuck to the disc substrate so as to form a transparent cover layer, comprises: a support table having a flat placing surface, on which the cover sheet is placed; a center pin disposed at the support table in such a manner as to project upward of the placing surface, the center pin including a disc supporting portion for supporting a peripheral edge of the center hole bored in the disc substrate at an intermediate portion in a height direction, a disc inserting portion to be inserted into the center hole bored in the disc substrate placed on the disc supporting portion at an upper end of the disc supporting portion, and a sheet inserting portion to be inserted into the opening bored in the cover sheet placed on the placing surface at a lower end of the disc supporting portion; an alignment lever disposed at the center pin in such a manner as to extend between the upper end of the disc inserting portion and the lower end of the sheet inserting portion, the lever swingably supported by the center pin about a strut disposed at an intermediate portion between a disc urging portion disposed at the upper end of the alignment lever and a sheet urging portion disposed at the lower end of the alignment lever; and an urging member for urging the alignment lever such that the disc urging portion is pushed out toward an outer periphery along the swing direction of the alignment lever and the sheet urging portion is pushed in toward the inner periphery; wherein when the disc substrate is lowered from the tip of the disc inserting portion down to the disc supporting portion the disc urging portion is pressed by an inner peripheral surface of the disc substrate, to be thus pushed in toward the inner periphery and the sheet urging portion is pushed out toward the outer periphery, so as to press the inner peripheral surface of the cover sheet on the placing surface in association with descent so that the alignment lever urges both of the cover sheet and the disc substrate in the same alignment direction.

In the alignment device for fabricating an optical disc according to the invention, when the disc substrate is lowered from the tip of the disc inserting portion at the center pin down to the disc supporting portion, the disc urging portion of the alignment lever disposed at the center pin is pressed at an inner peripheral surface of the disc substrate. The centre pin is thus pushed in toward the inner periphery and the sheet urging portion is pushed out toward the outer periphery, so as to press the inner peripheral surface of the cover sheet on the placing surface in association with the descent so that both of the cover sheet and the disc substrate are urged in the same alignment direction.

Consequently, the inner peripheral surface of the cover sheet is brought into press-contact with the end opposite to the alignment direction of the sheet inserting portion, and further, the inner peripheral surface of the disc substrate is brought into press-contact with the end opposite to the alignment direction of the disc inserting portion. This makes it possible to eliminate the generation of play between the inner peripheral surface of the cover sheet and the outer peripheral surface of the sheet inserting portion, and play between the inner peripheral surface of the disc substrate and the outer peripheral surface of the disc inserting portion. Therefore, the cover sheet and the disc substrate can be accurately positioned with reference to the ends opposite to the alignment direction in the sheet inserting portion and the disc inserting portion.

At this time, the center hole of the disc substrate and the opening of the cover sheet are formed with satisfactory high dimensional accuracy, and the sheet inserting portion is greater in outer diameter than that of the disc inserting portion by a dimension equal to a difference in inner diameter between the opening and the center hole. Thereby it is made possible to position the center of the disc substrate and the center of the cover sheet with satisfactory high dimensional accuracy, without any adverse influence of dimensional difference (i.e., play) between the center hole and the disc inserting portion, and dimensional difference (i.e., play) between the opening and the sheet inserting portion.

As described above, in the alignment device for fabricating an optical disc according to the invention, the center of the cover sheet and the center of the disc substrate can be aligned with each other with a satisfactory accuracy simply by inserting the center pin disposed at the support table into the opening formed in the cover sheet and the center hole formed in the disc substrate.

BRIEF DESCRIPTION OF THE DRAWINGS

FIG. 8A is a side cross-sectional view showing a sealed chamber formed inside of the vacuum tank which is lowered down to a sealed position.

FIG. 8B is a side cross-sectional view showing a disc substrate and the cover sheet pressed by a pressing member which is lowered down to a pressing position inside of the sealed chamber.

DETAILED DESCRIPTION OF THE INVENTION

An optical disc fabricating apparatus in a preferred embodiment according to the present invention will be described below in reference to the attached drawings.

Figure 1:
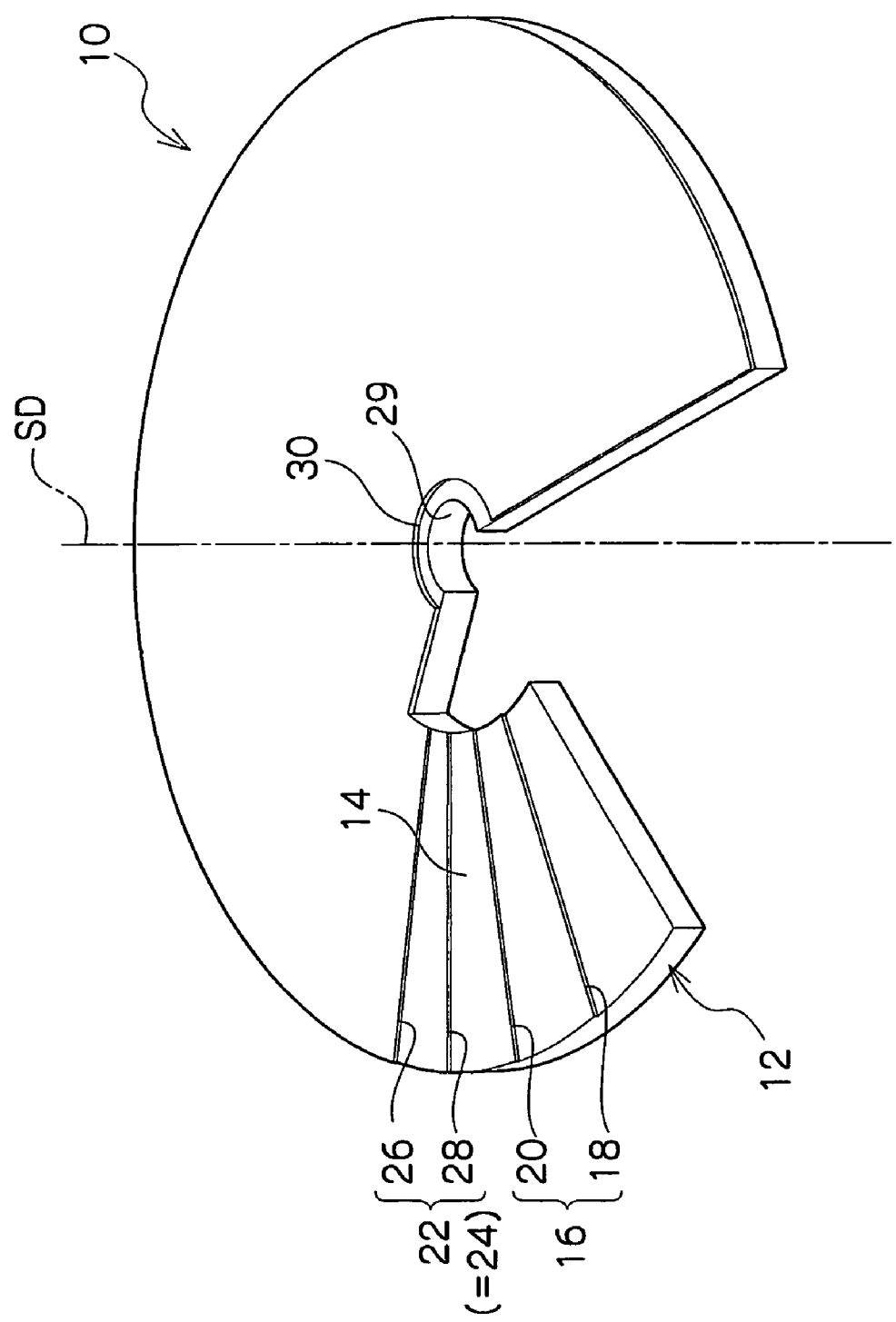
FIG. 1 is a perspective view showing the configuration of an optical disc in a preferred embodiment according to the present invention.

First of all, a description will be given of the configuration of an optical disc fabricated by an optical disc fabricating apparatus in a preferred embodiment according to the invention. FIG. 1 shows an optical disc fabricated by an optical disc fabricating apparatus in a preferred embodiment according to the invention. On this optical disc 10 can be recorded information at a density higher than that in an optical disc such as a DVD-R in the prior art. For example, in comparison with a conventional optical disc, it is assumed that a blue violet laser beam of a shorter wavelength is used as a recording and reproducing laser beam, and further, that a one-side recording capacity of the optical disc 10 having a diameter of 12 cm is increased up to about 27 Gbyte by increasing the aperture number NA of an objective lens in a disc driving device up to about 0.85.

In the optical disc 10, there is provided a disc substrate 12 formed in a disc shape. One surface of the disc substrate 12 serves as a recording surface 14. On the recording surface 14 side of the disc substrate 12 are laminated a beam reflecting layer 18 and a beam absorbing layer 20 in this order. The beam reflecting layer 18 and the beam absorbing layer 20 constitute an information recording layer 16 (hereinafter simply referred to as "a recording layer"). Furthermore, the optical disc 10 includes a transparent cover layer 22 on the disc substrate 12 in such a manner as to cover the recording layer 16. The cover layer 22 consists of a cover sheet 24 made of a transparent resin in a thickness of about 100 μm.

The disc substrate 12 is molded with a resin such as PC (polycarbonate). The cover sheet 24 is formed of a transparent resin film 26 made of PC (polycarbonate), PET (polyethylene terephthalate) and the like and an adhesive film 28 formed on one surface of the resin film 26. The adhesive film 28 is made of a known acrylic, rubber- or silicon-based adhesive agent, however it should be preferably made of an acrylic adhesive agent from the viewpoints of transparency and durability. The respective thicknesses of the resin film 26 and the adhesive film 28 in the cover sheet 24 are determined according to a preset value of the cover layer 22. For example, the thickness of the resin film 26 is set to 80 μm and the thickness of the adhesive film 28 is set to 20 μm in the case where the preset value of the thickness of the cover layer 22 is 100 μm.

At the center of the disc substrate 12 is bored a circular center hole 29 about an axis SD serving as the rotating center of the optical disc 10. At the center of the cover layer 22 is formed a circular opening 30 having a diameter greater than that of the center hole 29 about the axis SD.

Figure 2:
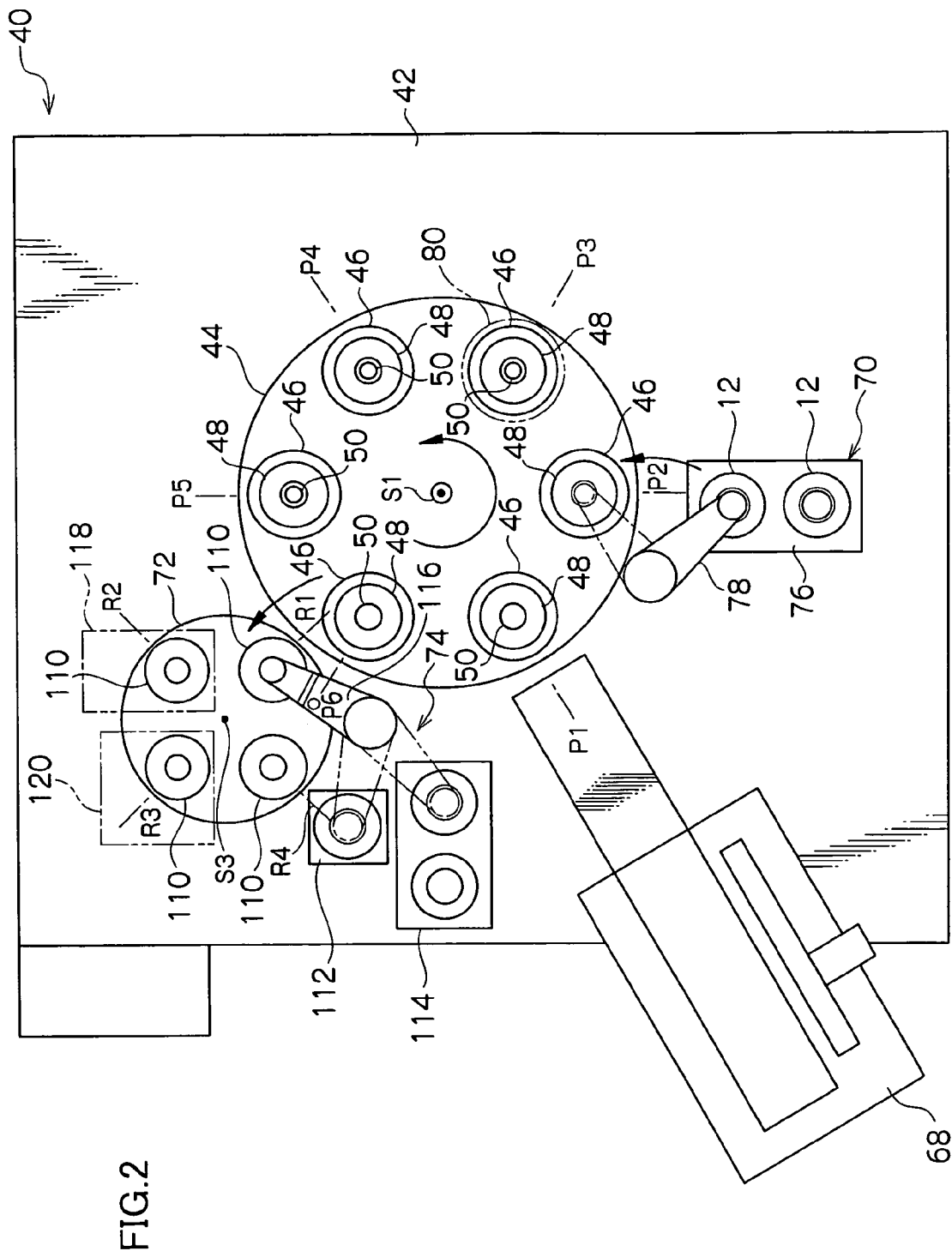
FIG. 2 is a plan view showing the configuration of an optical disc fabricating apparatus in the preferred embodiment according to the invention.

FIG. 2 shows an optical disc fabricating apparatus in the preferred embodiment according to the invention. The optical disc fabricating apparatus 40 is installed in an optical disc fabricating line, for fabricating the optical disc 10 by sticking the cover sheet 24 to the disc substrate 12 formed by molding or the like. To the optical disc fabricating apparatus 40 are supplied the disc substrate 12 and the cover sheet 24, which are fabricated through processes independent of each other in the optical disc fabricating line.

Figure 3:
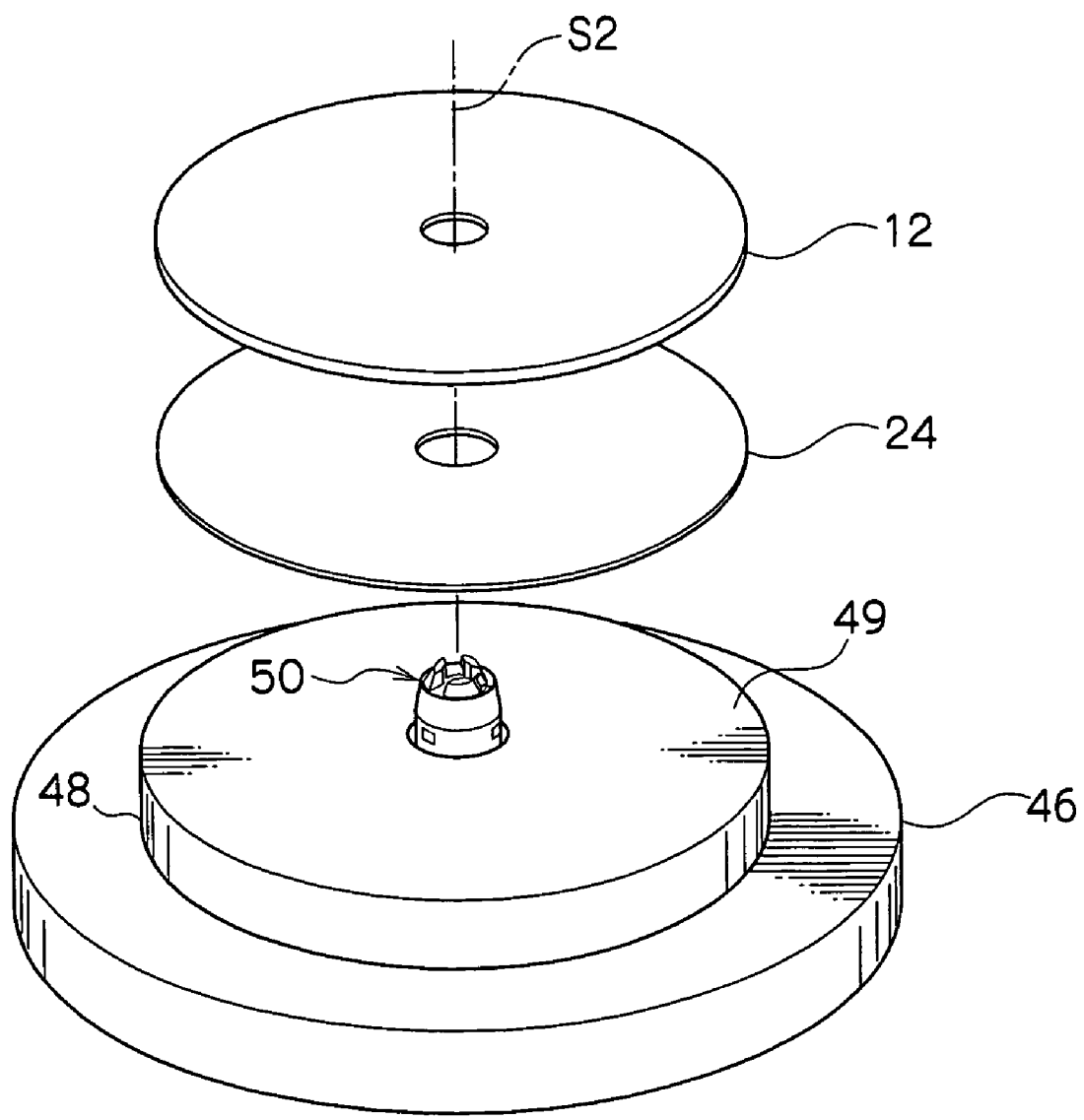
FIG. 3 is a perspective view showing the configuration of a support table and a center pin in the optical disc fabricating apparatus shown in FIG. 2.

The optical disc fabricating apparatus 40 includes a main casing 42 incorporating therein a control unit 38 (see FIG. 4) for controlling the entire apparatus. There is provided a disc-like first turntable 44 in the vicinity of the center of the upper portion in the main casing 42. The first turntable 44 is rotatably supported by the main casing 42 on an axis S1. Six table mounts 46, each of which is formed into a disc shape, are arranged at equal pitches (i.e., at a pitch of 60°) along a circumferential direction about the axis S1 on a side at the periphery of the first turntable 44. On each of the table mounts 46 is coaxially mounted a disc-like support table 48. As shown in FIG. 3, the upper surface of the support table 48 serves as a placing surface 49 formed in a smooth plane. The cover sheet 24 can be placed on the placing surface 49.

Figure 4:
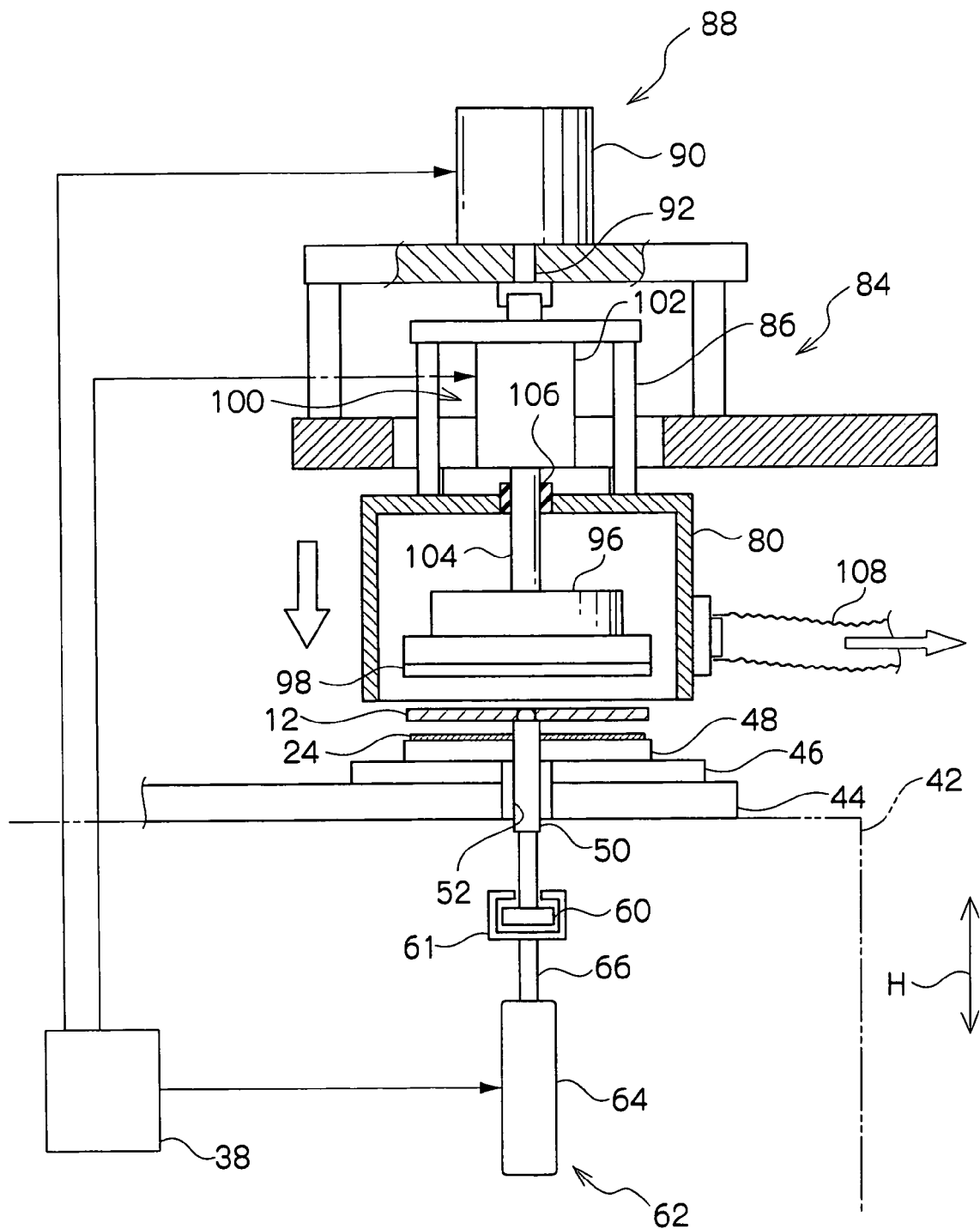
FIG. 4 is a side cross-sectional view showing the configuration of a vacuum tank and a mechanism for supporting and driving the vacuum tank in the optical disc fabricating apparatus shown in FIG. 2.

A center pin 50 is arranged at the support table 48 in such a manner as to project from the center of the placing surface 49. The center pin 50 is slidably inserted into a slide hole 52 penetrating through the first turntable 44, the table mount 46 and the support table 48, as shown in FIG. 4, and further, the fore end of the center pin 50 projects from the center of the placing surface 49 of the support table 48. The center pin 50 is formed into a substantially columnar shape with different outer diameters of the fore and rear ends, and further, is arranged coaxially with the support table 48.

Figure 5:
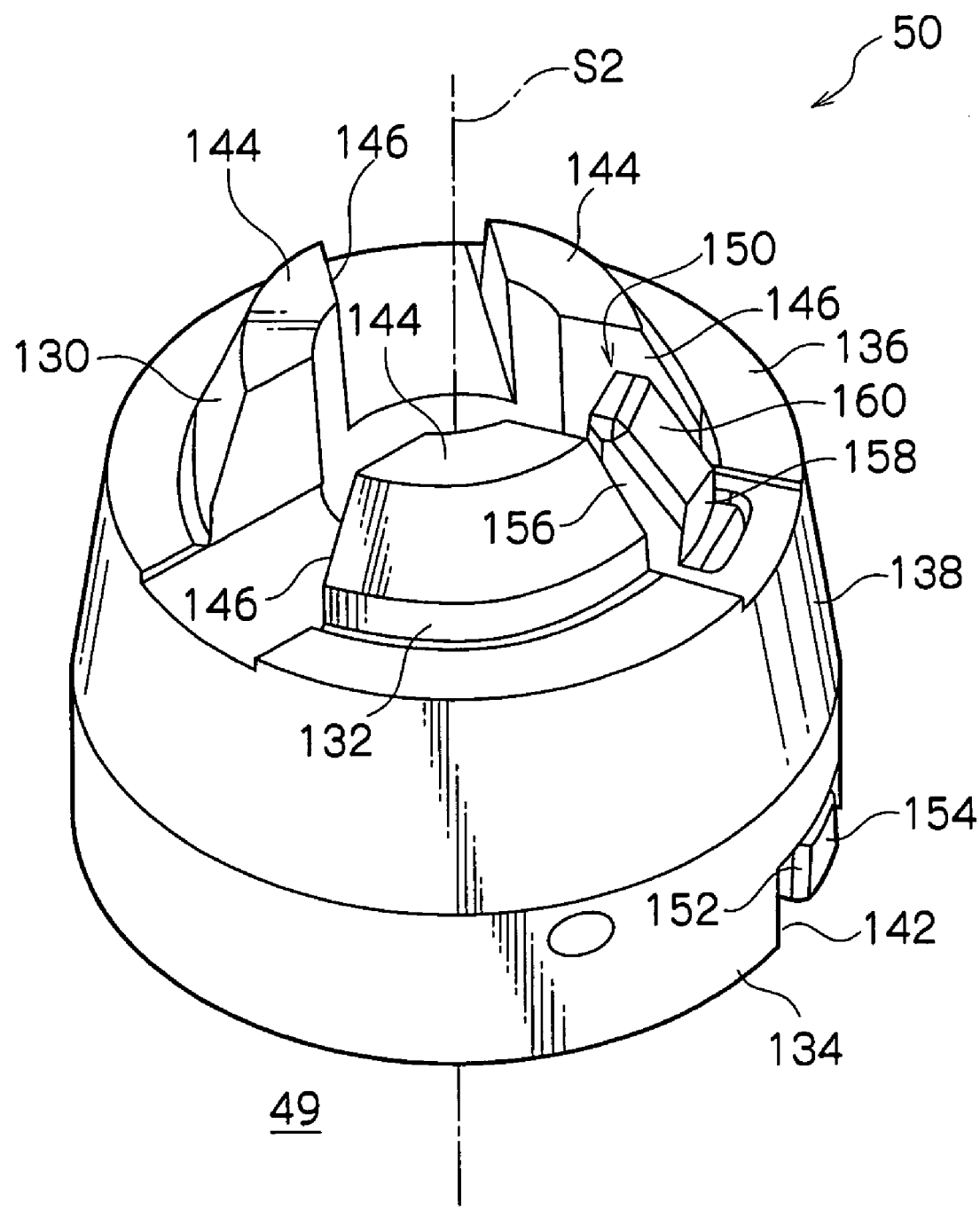
FIG. 5 is a perspective view showing the configuration of the center pin in the optical disc fabricating apparatus shown in FIG. 2.

As shown in FIG. 5, the center pin 50 includes a tip tapered portion 130 tapered toward the tip thereof and a disc inserting portion 132 under the tip tapered portion 130 having a fixed diameter smaller than that at the base end of the center pin 50. The disc inserting portion 132 has an outer diameter slightly smaller than a dimensional tolerance lower limit value (15 mm) which is the inner diameter of the center hole 29 in the disc substrate 12 (50 μm to 100 μm in the present preferred embodiment). At the center pin 50 at the base end, there is formed a sheet inserting portion 134 having a fixed outer diameter with respect to the disc inserting portion 132. The sheet inserting portion 134 has an outer diameter slightly smaller than a dimensional tolerance lower limit value (22 mm) which is the inner diameter of the opening 30 in the cover sheet 24 (50 μm to 100 μm in the present preferred embodiment). Moreover, the center pin 50 includes a step-like disc supporting portion 136 extending toward the periphery from the lower end of the disc inserting portion 132. Furthermore, an intermediate tapered portion 138 having an outer diameter gradually increasing toward the base end is formed between the peripheral end of the disc supporting portion 136 and the upper end of the sheet inserting portion 134.

Figures 6A, 6B, 6C:
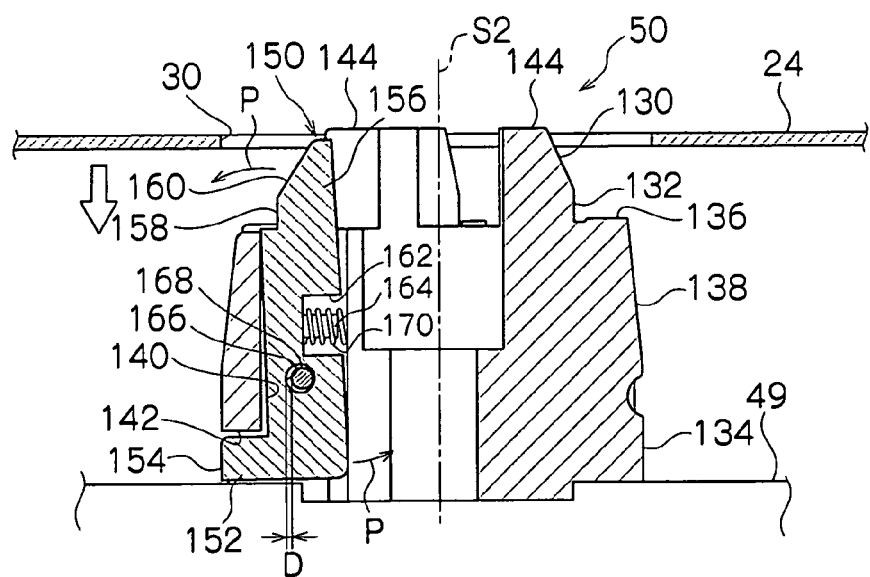
FIG. 6A is a side cross-sectional view showing the configuration and operation of an alignment lever disposed in the center pin shown in FIG. 5.
FIG. 6B is another side cross-sectional view showing the configuration and operation of the alignment lever disposed in the center pin shown in FIG. 5.
FIG. 6C is a further side cross-sectional view showing the configuration and operation of the alignment lever disposed in the center pin shown in FIG. 5.

As shown in FIGS. 6A to 6C, a hollow lever containing chamber 140 extending in an axial direction is formed at one end along a radial direction on an axis S2 inside of the center pin 50, and further, an inserting hole 142 is bored toward the periphery at the lower end of the lever containing chamber 140. The peripheral end of the inserting hole 142 is opened to the peripheral surface of the sheet inserting portion 134 at the center pin 50. As shown in FIG. 5, the tip tapered portion 130 and the disc inserting portion 132 at the center pin 50 are formed into a hollow shape at their internal peripheral sides, and further, are divided into three dividing pieces 144 along circumferential directions. Between the three dividing pieces 144 are formed three respective slits 146 extending in a radial direction. Here, the upper end of the lever containing chamber 140 is opened to one of the slits 146.

As shown in FIGS. 6A to 6C, an alignment lever 150 elongated along a vertical direction is contained inside of the lever containing chamber 140. At the lower end of the alignment lever 150 is formed an L-shaped sheet urging portion 152 projecting toward the periphery through the inserting hole 142. At the tip of the sheet urging portion 152 is formed a sheet pressing surface 154 (see FIG. 5) curved about the axis S2 at substantially the same curvature radius as that of the peripheral surface of the sheet inserting portion 134. Additionally, at the upper end of the alignment lever 150 is formed a wedge-like disc urging portion 156 projecting into the slit 146 from the lever containing chamber 140. As shown in FIG. 5, on the lower side of the peripheral surface of the disc urging portion 156 is formed a disc pressing surface 158 curved about the axis S2 at substantially the same curvature radius as that of the peripheral surface of the disc inserting portion 132. On the upper side of the disc pressing surface 158 is formed a disc guiding surface 160 having substantially the same shape and inclination as that of the peripheral surface of the tip tapered portion 130.

As shown in FIGS. 6A to 6C, a recess-like spring containing portion 162 is formed at the end surface on the internal peripheral side of the alignment lever 150. The spring containing portion 162 is arranged in the vicinity of the center of the alignment lever 150 along the axial direction, and further, a support projection 164 projects towards the inside from a bottom surface on the outer peripheral side of the spring containing portion 162. A strut hole 166 penetrating in a width direction of the alignment lever 150 is bored in a position that is between the spring containing portion 162 and the sheet urging portion 152 at the alignment lever 150. In the meantime, a strut 168 corresponding to the strut hole 166 is disposed inside of the lever containing chamber 140 at the center pin 50 in such a manner as to be relatively turnably inserted into the strut hole 166. Consequently, the alignment lever 150 is swingably supported by the center pin 50 on the strut 168. The inner diameter of the strut hole 166 is designed to be greater, by a predetermined dimensional difference D (see FIG. 6A), than the outer diameter of the strut 168. Therefore, a clearance (i.e., play) corresponding to the dimensional difference D is formed between the strut hole 166 and the strut 168.

A coil spring 170 is contained inside of the spring containing portion 162 at the alignment lever 150. The support projection 164 projecting from the face on the outer peripheral side is fittingly inserted into the coil spring 170. As a consequence, the coil spring 170 is supported substantially in parallel to the radial direction inside of the spring containing portion 162. Here, the coil spring 170 is compressed between the bottom surface of the spring containing portion 162 and the inner surface on the inner peripheral side of the lever containing chamber 140, thereby urging the alignment lever 150 in a predetermined pressing direction (i.e., in a direction indicated by an arrow P in FIG. 6A) in a swing direction about the strut 168. Specifically, the alignment lever 150 is urged in such a manner that the disc urging portion 156 and the sheet urging portion 152 are pushed toward the outer peripheral side and the inner peripheral side, respectively, by the coil spring 170.

The formation of play corresponding to the dimensional difference D between the strut hole 166 at the alignment lever 150 and the strut 168 at the center pin 50 enables the alignment lever 150 to be moved in the radial direction at a stroke equal to the dimensional difference D and to be urged toward the peripheral side in the radial direction at all times by the urging force of the coil spring 170.

As shown in FIG. 4, the center pin 50 is allowed to project into the main casing 42 at the lower end thereof, and further, a block-like joint member 60 is fixed at the lower end of the center pin 50. In addition, a first linear actuator 62 is disposed inside of the main casing 42 under the center pin 50. The first linear actuator 62 is provided with a cylinder 64 and a drive rod 66 projecting upward of the cylinder 64. The drive rod 66 is slidably supported along a height direction (i.e., in a direction indicated by an arrow H) by the cylinder 64. Another joint member 61 is fixed to the tip of the drive rod 66, which is detachably connected to the center pin 50 via the joint members 60 and 61.

Here, the cylinder 64 at the first linear actuator 62 is fixed at a position corresponding to an orbital position P3 in the main casing 42 via a bracket, not shown. When the support table 48, having the cover sheet 24 and the disc substrate 12 placed thereon, is moved to the orbital position P3 according to turning of the first turntable 44, the joint member 60 of the center pin 50 mounted on the support table 48 is fittingly inserted into and connected to the joint member 61 of the drive rod 66. Furthermore, when the support table 48 is moved from the orbital position P3 according to the turn of the first turntable 44 upon the completion of sticking between the cover sheet 24 and the disc substrate 12 on the support table 48, the joint member 60 in the support table 48 is removed from the joint member 61.

The first linear actuator 62 can be subjected to a servo control by the control unit 38, and thus, raises or lowers the drive rod 66 by a predetermined movement distance at a speed in response to a control signal output from the control unit 38. Consequently, the center pin 50 is varied in projection length from the placing surface 49 of the support table 48 according to the movement distance of the drive rod 66.

As shown in FIG. 2, the optical disc fabricating apparatus 40 includes, around the first turntable 44, a sheet supplying unit 68, a disc supplying unit 70, a second turntable 72 having a diameter smaller than that of the first turntable 44 and a disc conveying-out unit 74. Incidentally, in FIG. 2, starting from the support table 48 at a position at which the cover sheet 24 is supplied from the sheet supplying unit 68, positions at which the six support tables 48 and table mounts 46 are held along the rotational direction (counterclockwise) of the first turntable 44 are referred to as orbital positions P1 to P6 in the following description.

The sheet supplying unit 68 is installed near the periphery of the support table 48 held at the orbital position P1. The sheet supplying unit 68 is adapted to supply the cover sheet 24 onto the support table 48 located at the orbital position P1. The disc supplying unit 70 is installed outside near the periphery of the orbital position P2. The disc supplying unit 70 includes a disc mount 76, on which plural of the disc substrates 12 can be mounted, and a conveying arm 78 for gripping one of the plural disc substrates 12 mounted on the disc mount 76 and conveying the disc substrate 12 onto the support table 48 located at the orbital position P2.

In the optical disc fabricating apparatus 40 is disposed a vacuum tank 80 above the table mount 46 located at the orbital position P3. As shown in FIG. 4, the vacuum tank 80 is formed into a vessel having an open bottom. A seal member having elasticity, not shown, is attached over the entire lower surface of the vacuum tank 80. Furthermore, in the optical disc fabricating apparatus 40 is disposed a support frame 84 above the vacuum tank 80. The support frame 84 is adapted to support the vacuum tank 80 above the table mount 46 in a suspended manner. Moreover, at the top surface of the vacuum tank 80 is fixed a sub frame 86.

As shown in FIG. 4, a second linear actuator 88 for raising or lowering the vacuum tank 80 is installed in the support frame 84. The second linear actuator 88 is provided with a cylinder 90 fixed to the support frame 84 and a drive rod 92 projecting downward of the cylinder 90, wherein the tip of the drive rod 92 is connected to the sub frame 86. The second linear actuator 88 is controlled by the control unit 38 in such a manner as to hold the vacuum tank 80 at a released position, apart and above the table mount 46 (see FIG. 4), or at a sealed position, at which the lower end of the vacuum tank 80 is brought into press-contact with the table mount 46 (see FIGS. 8A and 8B) in response to a control signal output from the control unit 38. Here, an air-tight chamber 94 sealed from the outside is defined inside of the vacuum tank 80 held at the sealed position.

Inside of the vacuum tank 80, a pressing member 96 formed into a substantially thick disc shape is supported in a manner facing the support table 48. An elastic pad 98 having elasticity is secured to the lower surface of the pressing member 96. In the meantime, a third linear actuator 100 for supporting and driving the pressing member 96 is installed in the sub frame 86. The third linear actuator 100 includes a cylinder 102 fixed to the sub frame 86 and a drive rod 104 projecting downward of the cylinder 102. The drive rod 104 projects into the vacuum tank 80 through a seal ring 106 fitted to the top plate of the vacuum tank 80. The tip of the drive rod 104 is connected to the center at the upper surface of the pressing member 96.

The third linear actuator 100 is controlled by the control unit 38 in the state in which the vacuum tank 80 is held at the sealed position. Upon receipt of a control signal output from the control unit 38, the third linear actuator 100 lowers the pressing member 96 from a standby position (see FIG. 4) at which the pressing member 96 stands by above the support table 48 down to a pressed position at which the pressing member 96 is brought into press-contact with the cover sheet 24 and the disc substrate 12 placed on the support table 48. The pressing member 96 presses the cover sheet 24 and the disc substrate 12, and then, is returned to the standby position.

As shown in FIG. 4, one end of a flexible hose 108 is connected to the vacuum tank 80 in such a manner as to communicate with the inside of the vacuum tank 80. Via the flexible hose 108, a vacuum generating device such as a vacuum pump, not shown, is connected to the vacuum tank 80. Such a vacuum generating device is also controlled by the control unit 38. The control unit 38 reduces the pressure inside of the air-tight chamber 94, down to a predetermined degree of vacuum, by sucking out air remaining inside of the air-tight chamber 94 using the vacuum generating device. This is done when the vacuum tank 80 is lowered down to the sealed position so as to define the air-tight chamber 94.

The second turntable 72 is adapted to temporarily store thereon the optical discs 10 fabricated on the first turntable 44, and therefore, is arranged near the periphery of the support table 48 held at the orbital position P6, as shown in FIG. 2. On the second turntable 72 are mounted four disc support mounts 110, on which the disc substrates 12 can be mounted along a circumferential direction about an axis S3. Incidentally, in FIG. 2, starting from the disc support mount 110 at a position nearest the first turntable 44, positions at which the four disc support mounts 110 are held along a rotational direction (counterclockwise) of the second turntable 72 are referred to as orbital positions R1 to R4 in the following description.

As shown in FIG. 2, in the optical disc fabricating apparatus 40 is installed the disc conveying-out unit 74 adjacently to the second turntable 72. The disc conveying-out unit 74 includes an NG disc mount 112 and a good disc mount 114, on which the plural disc substrates 12 can be mounted, and a conveying arm 116 for conveying the optical disc 10 across the support table 48 held at the orbital position P6, the disc support mount 110 held at the orbital position R1, the NG disc mount 112 and the good disc mount 114.

Furthermore, in the optical disc fabricating apparatus 40, a peeling unit 118 for peeling and collecting a protective sheet (see FIG. 3) from a surface of the optical disc 10 (beam incident surface) is installed above the disc support mount 110 held at the orbital position R2 on the second turntable 72. Further, a surface inspecting unit 120 for inspecting the flatness of the beam incident surface of the optical disc 10, the degree of inclination with reference to the axis SD and the like is installed above the disc support mount 110 held at the orbital position R3.

Figure 9A:
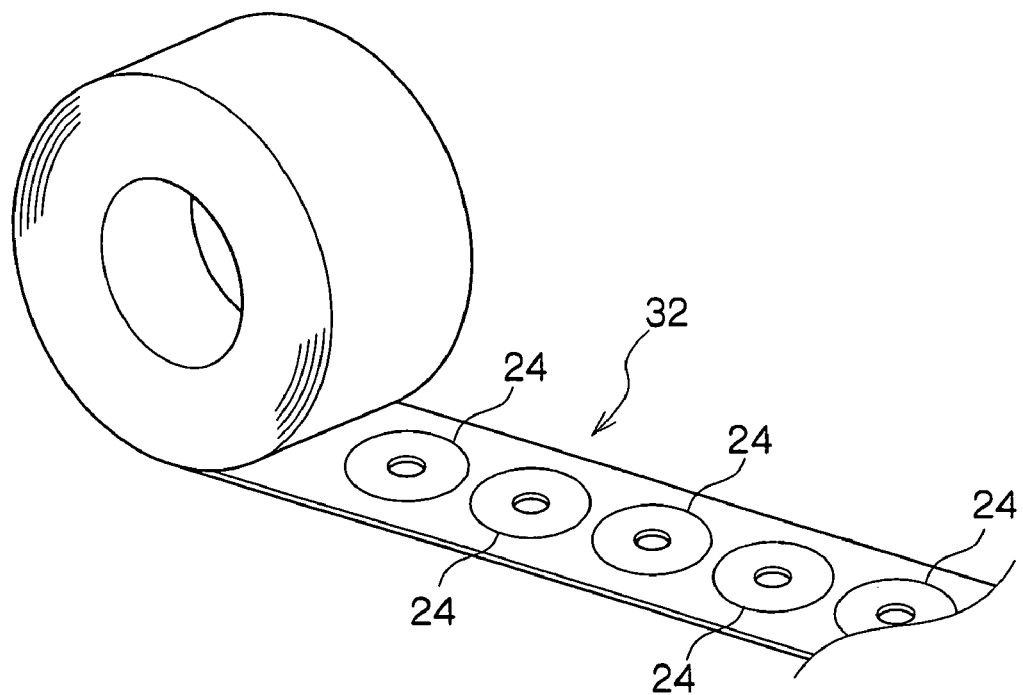
FIG. 9A is a perspective view showing the configuration of a laminate sheet member serving as a material of the cover sheet for use in an optical disc fabricating method in the preferred embodiment according to the invention.
Figure 9B:
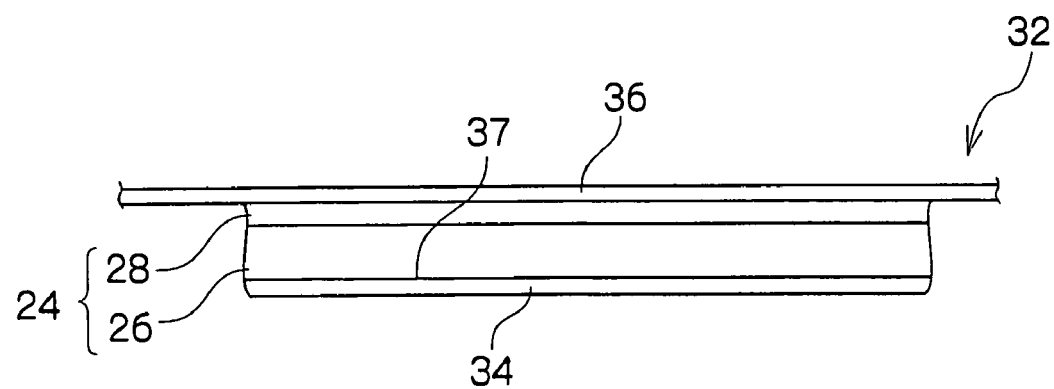
FIG. 9B is a side cross-sectional view showing the configuration of the laminate sheet member serving as the material of the cover sheet for use in the optical disc fabricating method in the preferred embodiment according to the invention.

The cover sheet 24 to be stuck onto the disc substrate 12 (see FIG. 3) is made of a laminate sheet member 32 of a four-layer structure consisting of the elongated belt-like resin film 26, the adhesive film 28 formed at one surface of the resin film 26, a peeling sheet 36 stuck to the adhesive film 28 and a protective sheet 34 stuck to the resin film 26 at the other surface on a side opposite to the adhesive film 28, as shown in FIG. 9B. Specifically, the cover sheet 24 is formed by punching the protective sheet 34, the resin film 26 and the adhesive film 28 of the laminate sheet member 32 in a disc-like shape by means of an annular punching blade, not shown. At this time, the peeling sheet 36 stuck to the adhesive film 28 of the cover sheet 24 is not punched by the punching blade, and therefore, remains in the elongated belt-like shape. The elongated belt-like peeling sheet 36 is used as a carrier base for conveying the cover sheet 24 punched from the laminate sheet member 32. The laminate sheet member 32 after the cover sheet 24 has been punched in the above-described manner is temporarily wound up in a roll, as shown in FIG. 9A, and then, is loaded in the sheet supplying unit 68.

Next, explanation will be made of a method for fabricating the optical disc 10 by the use of the optical disc fabricating apparatus 40 configured such as is described above.

Figure 7:
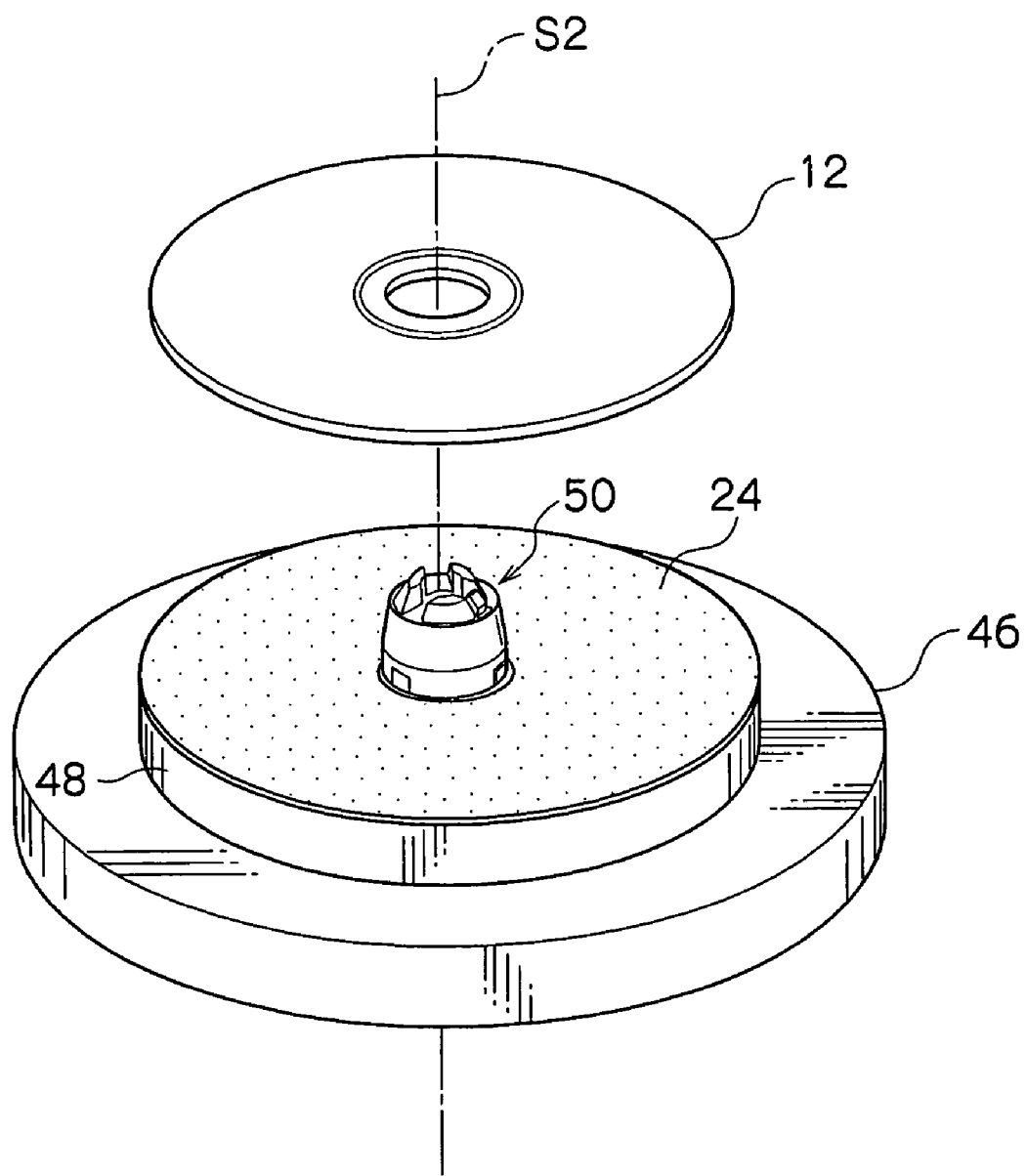
FIG. 7 is a perspective view showing a cover sheet placed on the support table shown in FIG. 3.

In the optical disc fabricating apparatus 40, when the support table 48 is moved to the orbital position P1, the sheet supplying unit 68 peels a piece of cover sheet 24 from the peeling sheet 36 in the laminate sheet member 32 in association with the movement, and further, the cover sheet 24 is placed on the placing surface 49 of the support table 48 in such a manner that the adhesive film 28 faces upward. At this time, the first linear actuator 62 holds the center pin 50 at an upper limit position, at which the tip of the sheet inserting portion 134 of the center pin 50 projects upward of the placing surface 49, as shown in FIG. 3. As a consequence, the sheet inserting portion 134 of the center pin 50 is inserted into the opening 30 of the cover sheet 24, as shown in FIG. 7. At this time, a fine clearance is defined between the outer peripheral surface of the sheet inserting portion 134 and the inner peripheral edge of the cover sheet 24. Further, another fine clearance is defined also between the sheet pressing surface 154 of the center pin 50 urged in the pressing direction (i.e., in the direction indicated by the arrow P) and the inner peripheral edge of the cover sheet 24, as shown in FIG. 6B.

In the optical disc fabricating apparatus 40, when the cover sheet 24 is placed on the support table 48 by the sheet supplying unit 68, the first turntable 44 is turned counterclockwise by a predetermined rotation quantity (an angle of 60°), so that the support table 48 having the cover sheet 24 supplied thereto is moved to the orbital position P2. When the support table 48 is moved to the orbital position P2 together with the cover sheet 24, the disc supplying unit 70 grips one of the plural disc substrates 12 placed on the disc mount 76, and then, conveys the disc substrate 12 onto the support table 48 at the orbital position P2, so as to place the inner peripheral edge of the center hole 29 of the disc substrate 12 on the disc supporting portion 136 of the center pin 50 while fittingly inserting the center hole 29 toward the outer periphery of the disc inserting portion 132 of the center pin 50, as shown in FIGS. 6B and 6C. In this manner, the disc inserting portion 132 of the center pin 50 positions the disc substrate 12 relative to the support table 48 in such a manner that the center of the disc substrate 12 and the axis S2 of the support table 48 are aligned with each other. Further, the disc supporting portion 136 of the center pin 50 supports the disc substrate 12 in a state separate and above the cover sheet 24.

At this time, when the disc substrate 12 is lowered from the tip of the disc inserting portion 132 onto the disc supporting portion 136, the disc urging portion 156 of the alignment lever 150 urged in the pressing direction by the coil spring 170 is pressed at the inner peripheral surface of the disc substrate 12, to be pushed toward the inner peripheral surfacein association with the descent and further, the sheet urging portion 152 is pushed toward the periphery, to thus press the inner peripheral surface of the cover sheet 24 on the placing surface 49. Consequently, the cover sheet 24 and the disc substrate 12 are urged in the same alignment direction (i.e., in a direction indicated by arrow A in FIG. 6C), and thus, are moved to positions at which they are brought into press-contact with the sheet inserting portion 134 and the disc inserting portion 132, respectively. As a result, as shown in FIG. 6C, no clearance is defined at all between the outer peripheral surface of the sheet inserting portion 134 at the end opposite to the alignment direction and the inner peripheral surface of the cover sheet 24.

Further, no clearance is defined at all between the outer peripheral surface of the disc inserting portion 132 at the end opposite to alignment direction and the facing inner peripheral surface of the disc substrate 12.

In the alignment lever 150 the disc urging portion 156 is pushed toward the inner periphery while the sheet urging portion 152 stops movement toward the outer periphery. There is play, corresponding to the dimensional difference D formed between the strut hole 166 of the alignment lever 150 and the strut 168 of the center pin 50. This means that when the reactive force is larger than the urging force of the coil spring 170 acting on the sheet pressing surface 154 from the cover sheet 24 the strut hole 166 is moved toward the inner peripheral surface, and relative to the strut 168. As a consequence, no pressing force larger than the urging force of the coil spring 170 acts on the cover sheet 24 from the sheet urging portion 152, thereby preventing the cover sheet 24 from being deformed by an excessive pressing force from the sheet urging portion 152 or from being rolled up from the placing surface 49.

In the optical disc fabricating apparatus 40, when the disc substrate 12 is placed on the disc supporting portion 136 of the center pin 50 by the disc supplying unit 70, the first turntable 44 is turned counterclockwise at an angle of 60°, so that the support table 48 having the cover sheet 24 and the disc substrate 12 supplied thereto is moved to the orbital position P3. When the support table 48 is moved to the orbital position P3, together with the cover sheet 24 and the disc substrate 12, the control unit 38 allows the second linear actuator 88 to lower the vacuum tank 80 from the released position to the sealed position, as shown in FIG. 8A. In this manner, the air-tight chamber 94 sealed from the outside is formed inside of the vacuum tank 80. Subsequently, the control unit 38 allows the vacuum generating device to suck out the air remaining inside of the air-tight chamber 94 so as to reduce the pressure inside of the air-tight chamber 94 down to the predetermined degree of vacuum. At this time, the vacuum generating device reduces the pressure inside of the air-tight chamber 94 down to a target degree of vacuum set within a range from 5 Pa to 100 Pa (30 Pa or lower in the present preferred embodiment), and maintains the inside of the air-tight chamber 94 at 30 Pa or lower till the completion of the sticking of the cover sheet 24 and the disc substrate 12 to each other.

The control unit 38 lowers the center pin 50, which has been located at the upper limit position, down to a predetermined lower limit position by the first linear actuator 62 when the inside of the air-tight chamber 94 is reduced down to 30 Pa or lower. At this lower limit position, the tip of the center pin 50 is located under the placing surface 49 in such a manner as not to project from the placing surface 49 of the support table 48, as shown in FIG. 8B. The descent of the center pin 50 from the upper limit position to the lower limit position allows the disc substrate 12 placed on the disc supporting portion 136 of the center pin 50 to be moved to above the cover sheet 24, and then, to place the recording surface 14 of the disc substrate 12 on the adhesive film 28 of the cover sheet 24. At this time, the control unit 38 controls an operating speed of the first linear actuator 62 in such a manner that the center pin 50 is lowered from the upper limit position to the lower limit position at a speed of 0.06 m/s.

After the center pin 50 is lowered down to the lower limit position, the control unit 38 controls the third linear actuator 100 to lower the pressing member 96 from the standby position (see FIG. 8A) to the pressed position (see FIG. 8B), thereby pressing the disc substrate 12 and the cover sheet 24 by a predetermined pressing force by the elastic pad 98 of the pressing member 96, and then, returning the pressing member 96 to the standby position. Here, the control unit 38 controls the pressing force generated by the third linear actuator 100 in such a manner that the pressing force to be exerted on the disc substrate 12 and the cover sheet 24 from the elastic pad 98 of the pressing member 96 becomes a target value selected from a range from 0.2 kPa to 1.0 kPa (0.5 kPa in the present preferred embodiment), and then, maintains the pressing force for 0.2 sec., before the pressing member 96 is returned from the pressed position to the standby position by the third linear actuator 100. Thus, the entire recording surface 14 of the disc substrate 12 is uniformly brought into close contact with the adhesive film 28 of the cover sheet 24, so that the cover sheet 24 is stuck to the disc substrate 12 by a satisfactory joining force, thereby leading to the completion of the fabrication of the optical disc 10 as a product material (see FIG. 1).

When the control unit 38 returns the pressing member 96 to the standby position, the inside of the air-tight chamber 94 is opened to the atmosphere through the vacuum generating device, and then, the second linear actuator 88 returns the vacuum tank 80 from the sealed position to the released position.

In the optical disc fabricating apparatus 40, when the vacuum tank 80 is returned to the released position, the support table 48 having the optical disc 10 placed thereon is moved to the orbital position P5 by turning the first turntable 44 counterclockwise, and further, to the orbital position P6. In association with the movement, the optical disc fabricating apparatus 40 grips the optical disc 10 placed on the support table 48 at the orbital position P6 by the conveying arm 78 of the disc conveying-out unit 74, and thereafter, places the optical disc 10 on the disc support mount 110 at the orbital position R1 on the second turntable 72 while turning over the obverse and reverse of the optical disc 10.

When the optical disc 10 is placed on the disc support mount 110 at the orbital position R1, the second turntable 72 intermittently turns counterclockwise, temporarily stops the support table 48 having the optical disc 10 placed thereon at each of the orbital position R2 and at the orbital position R3, and then, moves the support table 48 to the orbital position R4. The peeling unit 118 peels off and recovers the protective sheet from the optical disc 10 placed on the disc support mount 110, which is temporarily stopped at the orbital position R2.

Furthermore, the surface inspecting unit 120 inspects the surface condition such as the flatness or amount of inclination of the upper surface (the beam incident surface) of the optical disc 10 placed on the disc support mount 110, which is temporarily stopped at the orbital position R3. An inspection result by the surface inspecting unit 120 is transmitted to a control unit, not shown, in the optical disc fabricating apparatus 40. The control unit judges based on the inspection result of the surface inspecting unit 120 whether the optical disc 10 conveyed to the orbital position R3 by the second turntable 72 is NG product, which does not satisfy a previously determined quality criterion, or good product, which satisfies the quality criterion.

When the optical disc 10 is conveyed to the orbital position R4 by the second turntable 72 upon the completion of the inspection by the surface inspecting unit 120, the control unit in the optical disc fabricating apparatus 40 allows the conveying arm 116 to grip an NG optical disc 10 and convey it from the disc support mount 110 to the NG disc mount 112 so as to place it on the NG disc mount 112 in the case where the optical disc 10 at the orbital position R4 is an NG product. Whereas, the control unit in the optical disc fabricating apparatus 40 allows the conveying arm 116 to grip a good optical disc 10 and convey it from the disc support mount 110 to the good disc mount 114 so as to place it on the good disc mount 114 in the case where the optical disc 10 at the orbital position R4 is a good product. When the predetermined number of the lot size of optical discs 10, as NG and good product, placed on the disc mounts 112 and 114, respectively, are accumulated, the discs are conveyed from the disc mounts 112 and 114 to a device or the like for performing a re-inspecting process, a coating process or the like.

As described above, in the optical disc fabricating apparatus 40 in the present preferred embodiment, when the disc substrate 12 is lowered from the tip of the disc inserting portion 132 of the center pin 50 down to the disc supporting portion 136, in association with the decent the disc urging portion 156 of the alignment lever 150 disposed at the center pin 50 is pressed against the inner peripheral surface of the disc substrate 12 to be thus pushed toward the inside, and further, the sheet urging portion 152 is pushed toward the outside to thus press the inner peripheral surface of the cover sheet 24 on the placing surface 49, thereby urging both of the cover sheet 24 and the disc substrate 12 in the same alignment direction. Consequently, the inner peripheral surface of the cover sheet 24 is brought into press-contact with the outer peripheral surface of the sheet inserting portion 134 at the end opposite to the alignment direction. Further, the inner peripheral surface of the disc substrate 12 is brought into press-contact with the the peripheral surface of the disc inserting portion 132 at the end opposite to the alignment direction. Therefore, since play between the inner peripheral surface of the cover sheet 24 and the outer peripheral surface of the sheet inserting portion 134 and play between the inner peripheral surface of the disc substrate 12 and the outer peripheral surface of the disc inserting portion 132 can be prevented from being generated, the cover sheet 24 and the disc substrate 12 can be accurately positioned with reference to the sheet inserting portion 134 and the disc inserting portion 132 at the ends reverse to the alignment direction.

If the center hole 29 of the disc substrate 12 and the opening 30 of the cover sheet 24 are formed with a satisfactory high dimensional accuracy with respect to an eccentricity tolerance (for example, 100 µm), then the outer diameter of the sheet inserting portion 134 is increased more than the outer diameter of the disc inserting portion 132 by a dimension only equal to the dimensional difference between the inner diameter of the opening 30 and the inner diameter of the center hole 29, so that the center of the disc substrate 12 and the center of the cover sheet 24 can be positioned with a satisfactory high accuracy. That is, with an eccentricity smaller than the eccentricity tolerance without any adverse influence from the dimensional difference (play) between the center hole 29 and the disc inserting portion 132 and the dimensional difference (play) between the opening 30 and the sheet inserting portion 134.

Figure 10:
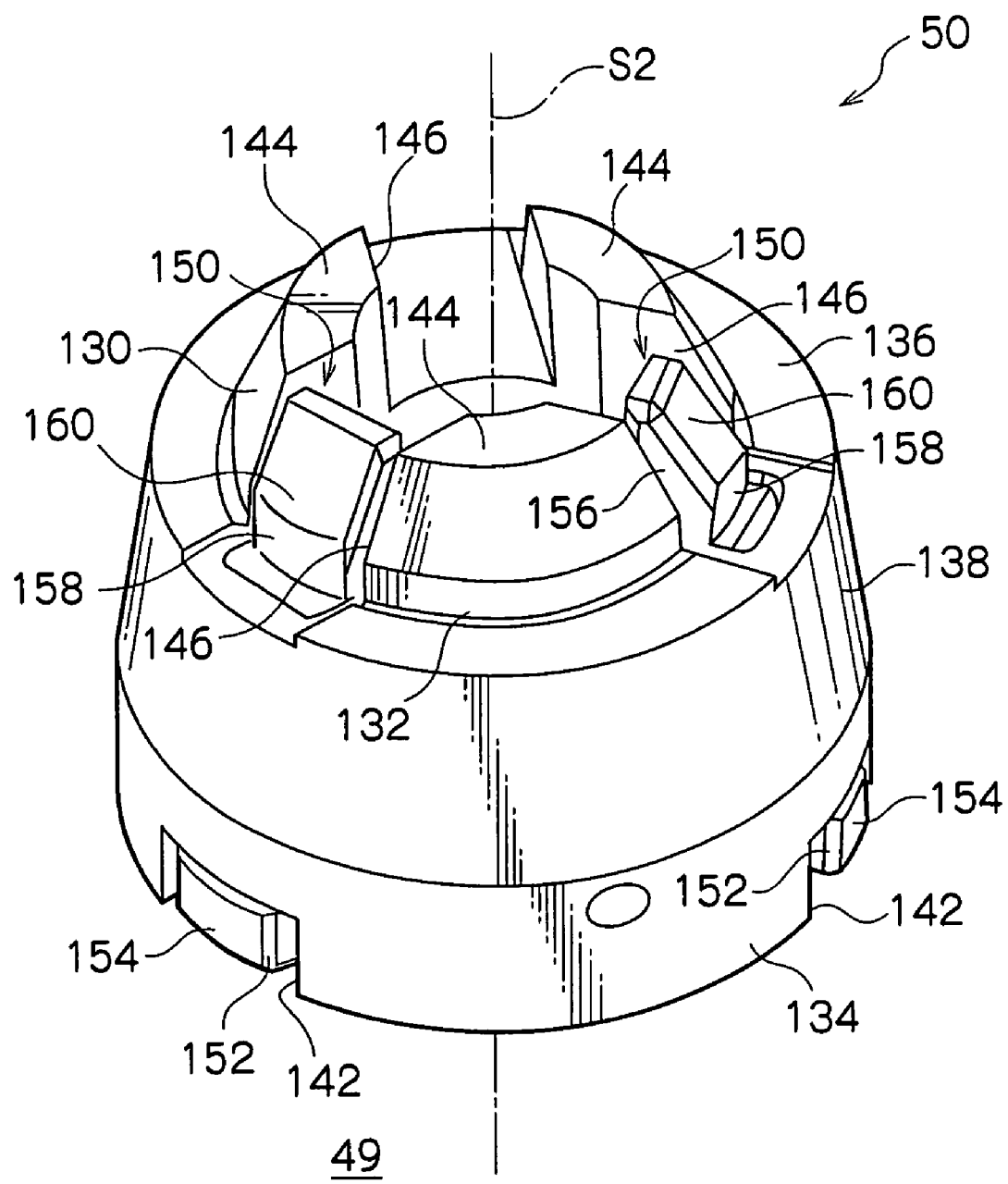
FIG. 10 is a perspective view showing the configuration in which two alignment levers are disposed in the center pin in another preferred embodiment according to the invention.

Incidentally, the center pin 50 may include two alignment levers 150 according to the material, strength or the like of the cover sheet 24, as shown in FIG. 10. As shown in FIG. 10, two alignment levers 150 are arranged at an interval of 120° along the circumferential direction about the axis S2 in the center pin 50. Each of the alignment levers 150 actuates in the same manner as that described in reference to FIGS. 6A to 6C when the disc substrate 12 is fittingly inserted into the disc inserting portion 132. As a result, the cover sheet 24 and the disc substrate 12 are urged in a direction which is the composite of the respective urging directions (i.e., the respective alignment directions) of the two alignment levers 150. Also in this case, the center of the cover sheet 24 and the center of the disc substrate 12 can be positioned with a satisfactory high accuracy. At this time, since the urging force for positioning the cover sheet 24 can act dispersively using the two alignment levers 150, it is possible to prevent any deformation of the cover sheet 24 so as to enhance the positioning accuracy with respect to the cover sheet 24 in comparison with the case where the urging force acts by the single alignment lever 150.

Figure 11A:
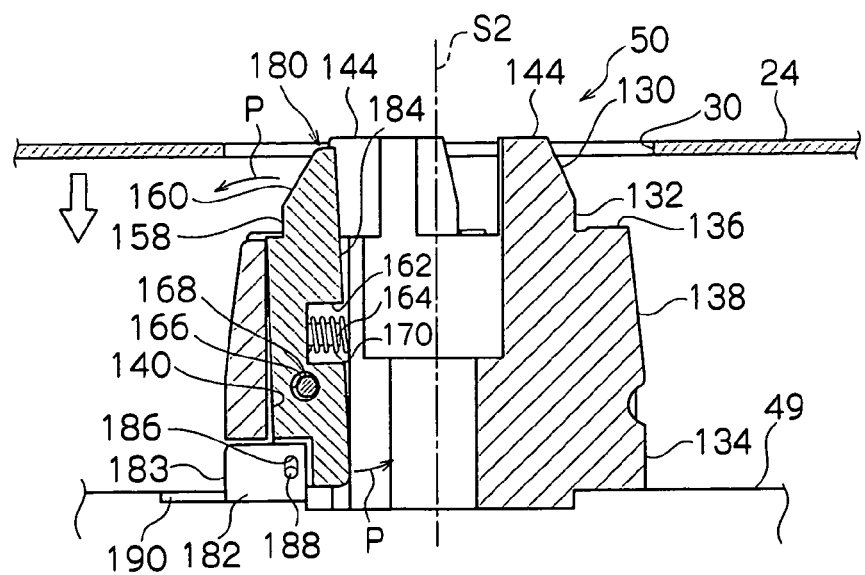
FIG. 11A is a side cross-sectional view showing the configuration and operation in a first modification of the alignment lever applicable to the optical disc fabricating apparatus in the preferred embodiment.
Figure 11B:
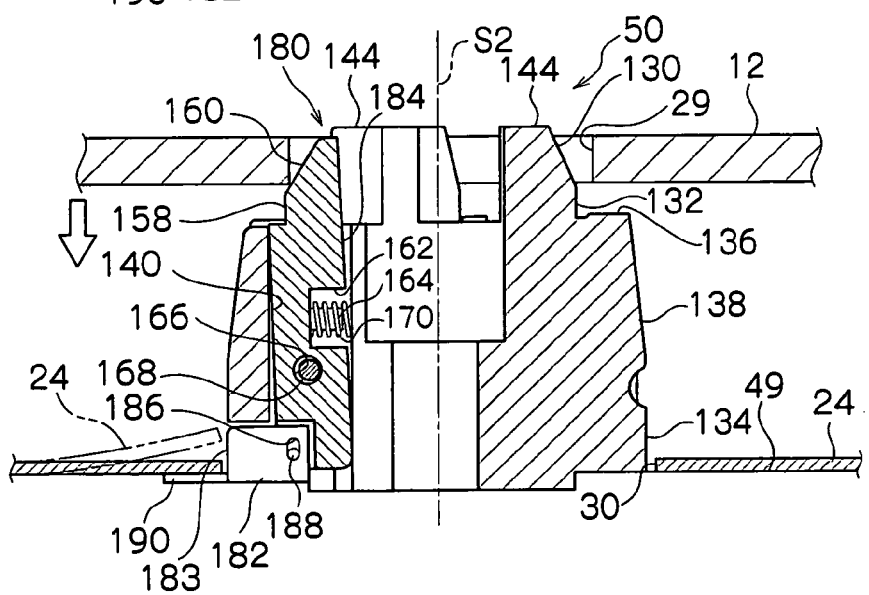
FIG. 11B is another side cross-sectional view showing the configuration and operation in the first modification of the alignment lever applicable to the optical disc fabricating apparatus in the preferred embodiment.
Figure 11C:
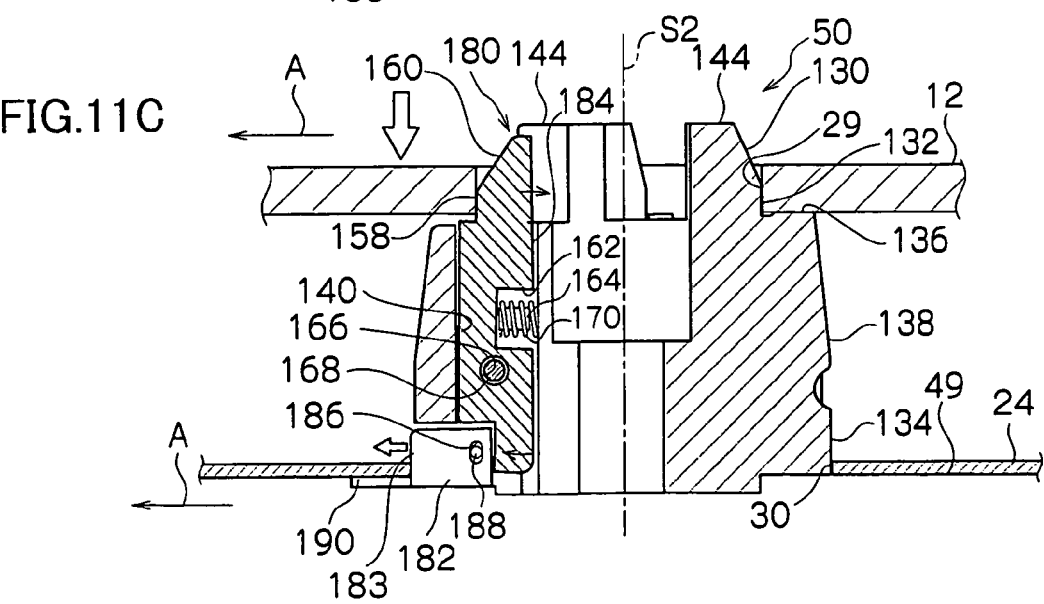
FIG. 11C is a further side cross-sectional view showing the configuration and operation in the first modification of the alignment lever applicable to the optical disc fabricating apparatus in the preferred embodiment.

Next, a first modification of an alignment lever applicable to the optical disc fabricating apparatus in the present preferred embodiment will be described with reference to FIGS. 11A to 11C. In an alignment lever 180 shown in FIGS. 11A to 11C, a sheet urging portion 182 disposed at a lower portion of the alignment lever 180 is formed independently of a lever main body 184. A strut hole 186, elongated in a vertical direction, is formed at an end on an inner peripheral side of the sheet urging portion 182. Into the strut hole 186 is inserted a rod-like strut 188 formed at the lower end of the lever main body 184 in such a manner as to be relatively movable in the vertical direction and turnable. In this manner, the sheet urging portion 182 is connected to the lever main body 184 in such a manner as to be swingable with respect to the lever main body 184 about the strut 188 and movable in the vertical direction.

In the meantime, one guide groove 190 is formed at the placing surface 49 in such a manner as to extend from the end portion on the inner peripheral side towards an outer peripheral side along a radial direction. Into the guide groove 190 is inserted the lower end of the sheet urging portion 182 slidably along the radial direction. Here, the sheet urging portion 182 is moved along the radial direction inside of the guide groove 190 while the lower end of the sheet urging portion 182 is brought into contact with the bottom of the guide groove 190 at all times. Consequently, the sheet urging portion 182 maintains a sheet pressing surface 183, serving as the edge face on the outer peripheral side, in a state perpendicular to the placing surface 49 at all times even if the alignment lever 180 is swung and moved along the radial direction.

In the optical disc fabricating apparatus 40 using the alignment lever 180 in the first modification, the sheet pressing surface 183 is maintained in the state perpendicular to the placing surface 49 at all times when the sheet urging portion 182 is moved toward the periphery to press the inner peripheral surface of the cover sheet 24 on the placing surface 49 in association with the descent of the disc substrate 12 from the tip of the disc inserting portion 132 down onto the disc supporting portion 136. By so doing only a pressing force parallel to the radial direction can be allowed to act on the cover sheet 24, without any action of an upward partial force on the cover sheet 24. As a result, it is possible to effectively prevent any degradation of positional accuracy caused by the rolling-up of the cover sheet 24 pressed by the sheet urging portion 182 by the upward partial force, as indicated by a chain double-dashed line in FIG. 11B.

Figure 12A:
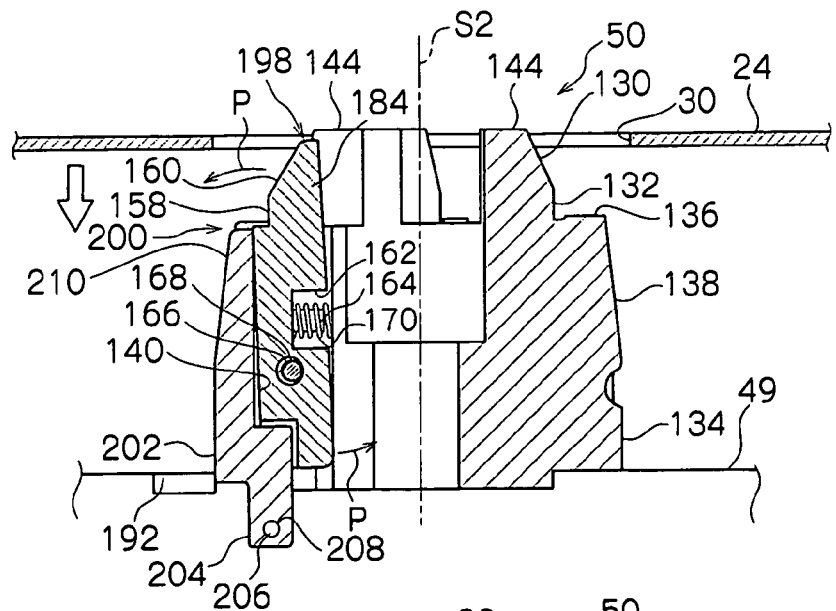
FIG. 12A is a side cross-sectional view showing the configuration and operation in a second modification of the alignment lever applicable to the optical disc fabricating apparatus in the preferred embodiment.
Figure 12B:
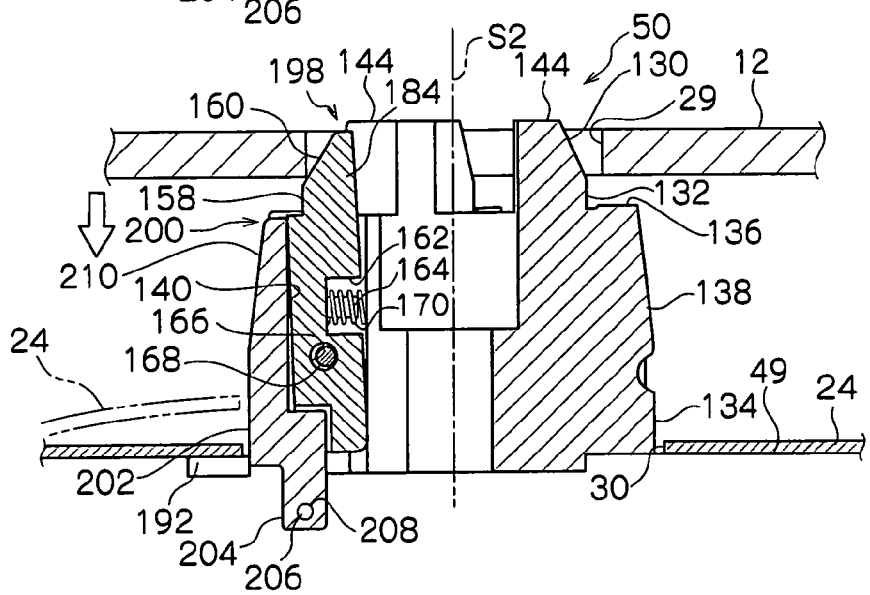
FIG. 12B is another side cross-sectional view showing the configuration and operation in the second modification of the alignment lever applicable to the optical disc fabricating apparatus in the preferred embodiment.
Figure 12C:
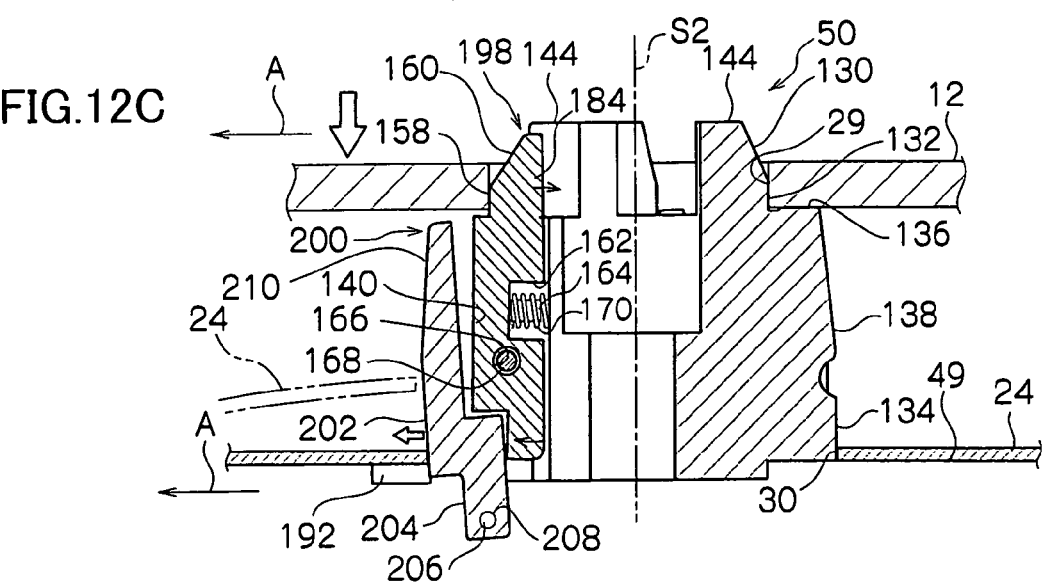
FIG. 12C is a further side cross-sectional view showing the configuration and operation in the second modification of the alignment lever applicable to the optical disc fabricating apparatus in the preferred embodiment.

Next, an alignment lever applicable to the optical disc fabricating apparatus in the present preferred embodiment will be described in a second modification in reference to FIGS. 12A to 12C. Also in an alignment lever 198 shown in FIGS. 12A to 12C, a sheet urging portion 200 is formed independently of the lever main body 184. The sheet urging portion 200 includes, at the lower end thereof, a connecting portion 204 extending downward beyond the placing surface 49. At the connecting portion 204 is bored a strut hole 206 extending in parallel to the strut hole 166 formed at the lever main body 184. In the meantime, an swinging shaft 208 is disposed at the lever main body 184, and is turnably inserted into the strut hole 206. Consequently, the sheet urging portion 200 is swingably connected to the lever main body 184 about the swinging shaft 208. Furthermore, on the sheet urging portion 200 is formed a substantially wedge-like guide portion 210 whose width gradually becomes smaller along a radial direction toward the tip of the center pin 50, at the upper portion with respect to a sheet pressing surface 202. The peripheral surface of the guide portion 210 serves as a guide surface of the cover sheet 24. The guide surface is supported in such a manner as to almost accord with the outer peripheral surface of the intermediate tapered portion 138 before the disc substrate 12 is fittingly inserted onto the disc inserting portion 132.

At the placing surface 49 of the support table 48 is formed a grooved recess 192 in such a manner as to extend from a inner peripheral end toward the outer periphery along the radial direction. When the alignment lever 198 is swung in a pressing direction, the lower end of the sheet pressing surface 202 at the sheet urging portion 200 is inserted into the recess 192. At this time, a clearance is defined between the sheet urging portion 200 and the recess 192. As a consequence, the sheet urging portion 200 can be swung in a direction, in which the upper end falls down toward the outer periphery about the swinging shaft 208 (see FIG. 12C), in the state in which the alignment lever 198 is swung in the pressing direction.

In the optical disc fabricating apparatus 40 using the alignment lever 198 in the second modification, the sheet urging portion 200 is swung about the swinging shaft 208 in a direction, in which the upper end falls down toward the periphery, by the reactive force from the cover sheet 24 when the inner peripheral surface of the cover sheet 24 on the placing surface 49 is pressed by the sheet pressing surface 202 together with the movement of the sheet urging portion 200 toward the outer periphery in association with the descent of the disc substrate 12 from the tip of the disc inserting portion 132 onto the disc supporting portion 136. Thereby a partial force toward the placing surface 49 (i.e., downward) is allowed to act on the cover sheet 24 by the sheet pressing surface 202. Consequently, as indicated by chain double-dashed lines in FIGS. 12B and 12C, the cover sheet 24 can be pressed on the placing surface 49 while allowing the partial force by the sheet pressing surface 202 toward the placing surface 49 to act on the cover sheet 24 and pressing the cover sheet 24 by the sheet urging portion 200 in the alignment direction, even in the case where the vicinity of the inner peripheral end of the cover sheet 24 is deformed to be floated away from the placing surface 49. Thus any floating of the vicinity of the inner peripheral end of the cover sheet 24 from the placing surface 49 is effectively prevented, so as to prevent any degradation of the positional accuracy.

Incidentally, both of the alignment lever 180 in the first modification and the alignment lever 198 in the second modification may be arranged as two of each at the center pin 50 in the same manner as the alignment lever 150 shown in FIG. 10.

What is claimed is:

1. An alignment device for fabricating an optical disc, in which the center of a cover sheet and the center of a disc shaped disc substrate are aligned with each other when the optical disc is fabricated with the disc substrate having a circular center hole bored at the center thereof and the cover sheet having a circular opening greater in diameter than the center hole bored in the center of the disc substrate and the cover sheet being stuck to the disc substrate so as to form a transparent cover layer, the device comprising:

a support table having a flat placing surface, on which the cover sheet is placed;

a center pin disposed at the support table in such a manner as to project upward of the placing surface, the center pin including a disc supporting portion for supporting a peripheral edge of the center hole bored in the disc substrate at an intermediate portion in a height direction, a disc inserting portion to be inserted into the center hole bored in the disc substrate placed on the disc supporting portion at an upper end of the disc supporting portion, and a sheet inserting portion to be inserted into the opening bored in the cover sheet placed on the placing surface at a lower end of the disc supporting portion;

an alignment lever disposed at the center pin in such a manner as to extend between the upper end of the disc inserting portion and the lower end of the sheet inserting portion, the lever being swingably supported by the center pin about a strut disposed at an intermediate portion between a disc urging portion disposed at the upper end of the alignment lever and a sheet urging portion disposed at the lower end of the alignment lever; and an urging member for urging the alignment lever such that the disc urging portion is pushed out toward an outer periphery along the swing direction of the alignment lever and the sheet urging portion is pushed in toward the inner periphery;

wherein when the disc substrate is lowered from the tip of the disc inserting portion down to the disc supporting portion the disc urging portion is pressed by an inner peripheral surface of the disc substrate, to be thus pushed in toward the inner periphery and the sheet urging portion is pushed out toward the outer periphery, so as to press the inner peripheral surface of the cover sheet on the placing surface in association with descent so that the alignment lever urges both of the cover sheet and the disc substrate in the same alignment direction.

2. The alignment device according to claim 1, wherein play, for allowing radial movement of the alignment lever when the cover sheet is pressed by the sheet urging portion, is formed between the strut and the alignment lever, and further, the alignment lever is urged toward the outer periphery along the radial direction at all times by the urging member.

3. The alignment device according to claim 1, further comprising:

a guide portion, swingably connected to the sheet urging portion and to a lever main body, disposed on the disc urging portion side of the sheet urging portion in the alignment lever, and that moves with the sheet urging portion substantially in parallel to the placing surface in engagement with the sheet urging portion.

4. The alignment device according to claim 2, further comprising:

a guide portion, swingably connected to the sheet urging portion and to a lever main body, disposed on the disc urging portion side of the sheet urging portion in the alignment lever, and that moves with the sheet urging portion substantially in parallel to the placing surface in engagement with the sheet urging portion.

5. The alignment device according to claim 1, further comprising:

a raiser/lowerer for lowering the center pin to superimpose the disc substrate on the cover sheet, when the cover sheet is placed on the placing surface and the disc substrate is supported by the disc supporting portion.

6. The alignment device according to claim 2, further comprising:

a raiser/lowerer for lowering the center pin to superimpose the disc substrate on the cover sheet, when the cover sheet is placed on the placing surface and the disc substrate is supported by the disc supporting portion.

7. The alignment device according to claim 1, wherein a tip tapered portion is disposed at the tip of the center pin.

8. The alignment device according to claim 2, wherein a tip tapered portion is disposed at the tip of the center pin.

9. The alignment device according to claim 1, wherein the outer diameter of the disc inserting portion is slightly smaller than a lower limit value of a dimensional tolerance of an inner diameter of the center hole of the disc substrate.

10. The alignment device according to claim 2, wherein the outer diameter of the disc inserting portion is slightly smaller than a lower limit value of a dimensional tolerance of an inner diameter of the center hole of the disc substrate.

11. The alignment device according to claim 1, wherein the outer diameter of the sheet inserting portion is slightly smaller than a lower limit value of a dimensional tolerance of an inner diameter of the opening of the cover sheet.

12. The alignment device according to claim 2, wherein the outer diameter of the sheet inserting portion is slightly smaller than a lower limit value of a dimensional tolerance of an inner diameter of the opening of the cover sheet.

13. The alignment device according to claim 9, wherein the outer diameter of the sheet inserting portion is slightly smaller than a lower limit value of a dimensional tolerance of an inner diameter of the opening of the cover sheet.

14. The alignment device according to claim 10, wherein the outer diameter of the sheet inserting portion is slightly smaller than a lower limit value of a dimensional tolerance of an inner diameter of the opening of the cover sheet.

15. The alignment device according to claim 1, wherein a step-like disc supporting portion extending toward the outer periphery from the lower end of the disc inserting portion is disposed at the center pin.

16. The alignment device according to claim 2, wherein a step-like disc supporting portion extending toward the outer periphery from the lower end of the disc inserting portion is disposed at the center pin.

17. The alignment device according to claim 15, wherein an intermediate tapered portion whose outer diameter gradually increases toward a base end is formed between the outer peripheral end of the disc supporting portion and the upper end of the sheet inserting portion.

18. The alignment device according to claim 16, wherein an intermediate tapered portion whose outer diameter gradually increases toward a base end is formed between the outer peripheral end of the disc supporting portion and the upper end of the sheet inserting portion.

19. The alignment device according to claim 1, wherein inside of the center pin a hollow lever containing chamber extending in an axial direction is formed at one end thereof along a radial direction, and an inserting hole is bored toward the outer periphery at the lower end of the lever containing chamber.

20. An alignment device according to claim 19, wherein an outer peripheral end of the inserting hole is open to an outer peripheral surface of the sheet inserting portion at the center pin.

* * * * *